Figure 6:
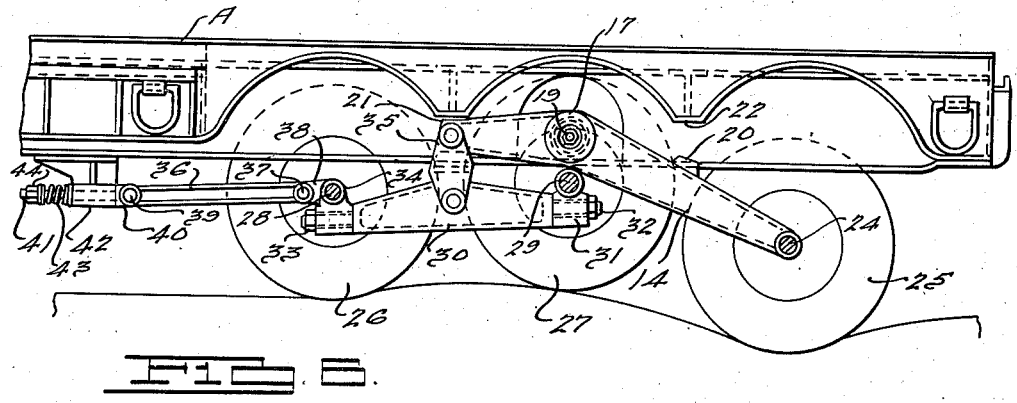

April 9, 1946.　　　　F. M. REID　　　　2,398,248
HEAVY DUTY VEHICLE
Filed June 14, 1945　　　3 Sheets-Sheet 1
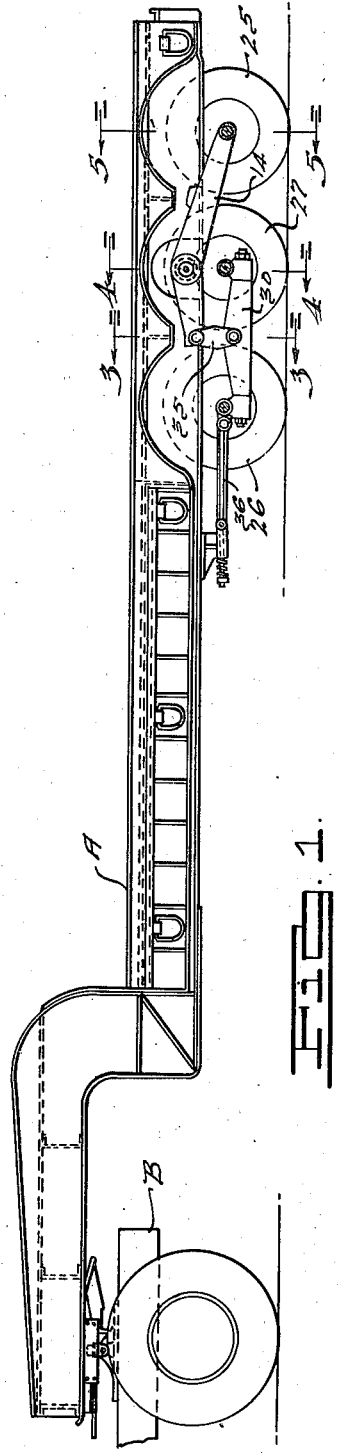
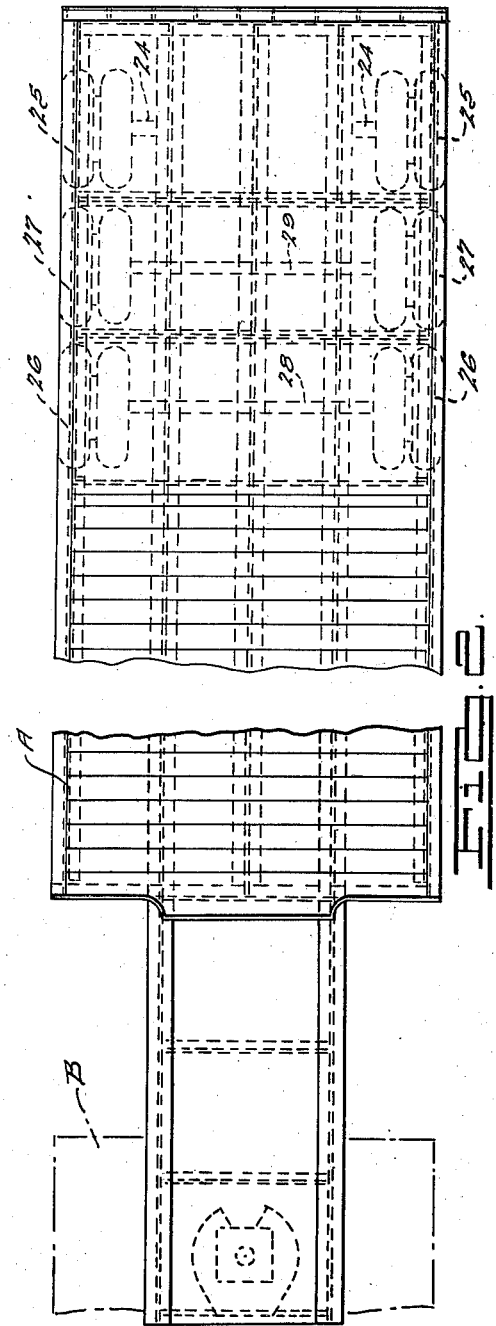
INVENTOR.
Frederick M. Reid.
BY
Harness, Dickey & Pierce
ATTORNEYS.

April 9, 1946.  F. M. REID  2,398,248
HEAVY DUTY VEHICLE
Filed June 14, 1945  3 Sheets-Sheet 2
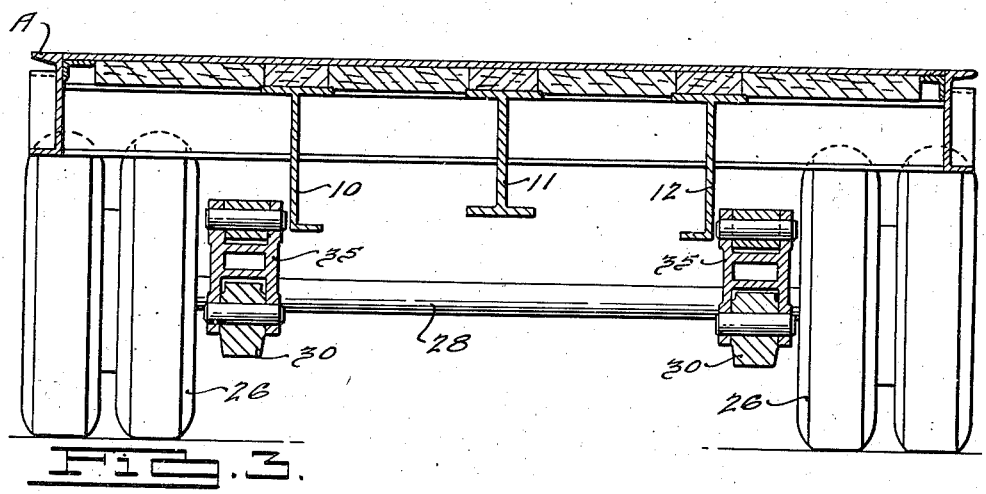
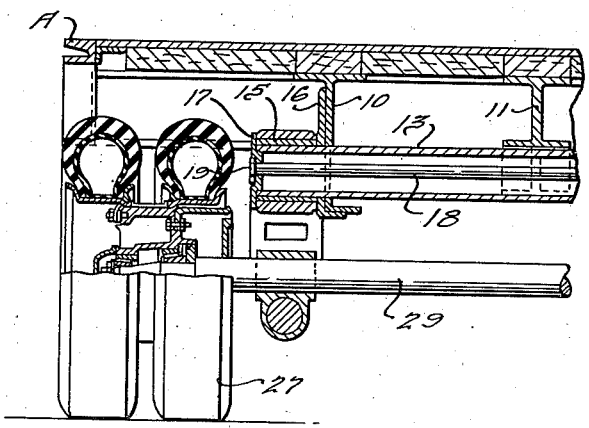
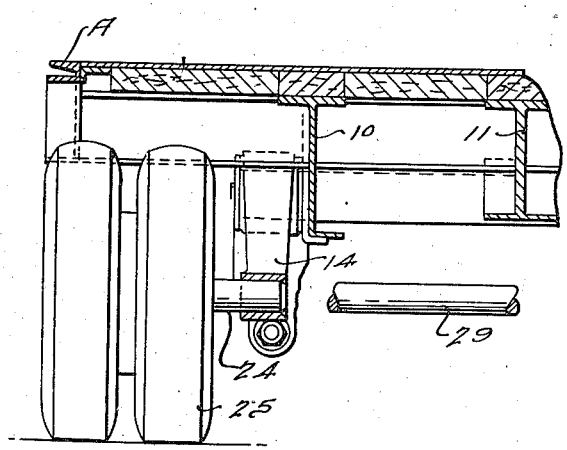
INVENTOR.
Frederick M. Reid.
BY
Harness, Dickey & Pierce.
ATTORNEYS.

April 9, 1946.  F. M. REID  2,398,248
HEAVY DUTY VEHICLE
Filed June 14, 1945  3 Sheets-Sheet 3

INVENTOR.
Frederick M. Reid.
BY
Harness, Dickey & Pierce.
ATTORNEYS.

Patented Apr. 9, 1946

2,398,248

UNITED STATES PATENT OFFICE 2,398,248

HEAVY-DUTY VEHICLE

Frederick M. Reid, Grosse Pointe, Mich., assignor to Fruehauf Trailer Company, Detroit, Mich., a corporation of Michigan Application June 14, 1945, Serial No. 599,435

7 Claims. (Cl. 280—104.5)

This invention relates broadly to heavy duty vehicles and to a novel wheel assembly therefor.

More particularly, the present invention relates to the same class of heavy duty vehicles shown and described in Patent No. Re. 22,102, reissued May 26, 1942. This patent discloses a semitrailer, the rear portion of which is supported by two four-wheel trucks. The trucks are mounted at opposite sides of the vehicle and the four wheels of each truck are disposed in forward and rearward pairs. By mounting the wheels in this manner, a large road-contacting area is provided and the weight is distributed to minimize damage to the roadway. This arrangement is generally satisfactory, except that the inner wheels of the trucks are exceedingly difficult to get at and if a tire on any of these wheels is punctured or blows out when the trailer is loaded, it is necessary to remove the load before the tire can be changed. The trailer is adapted to carry heavy freight, such as landing barges, excavating machines, and the like, and the load cannot be removed without the aid of special toools and heavy-duty hoisting and loading equipment. As a result, if the tire is punctured or blows out when the vehicle is en route, it is necessary to complete the trip without changing the tire with consequent damage to the tire, tube and wheel.

The instant invention embodies a novel type of wheel assembly for heavy-duty vehicles which secures all of the advantages of the patented structure above referred to, together with the additional advantage that all of the wheels can be easily removed for repairs or replacement with the vehicle either empty or loaded.

Considered in certain of its broader aspects, the invention includes a four-wheel truck which comprises two pairs of wheels arranged in tandem. The truck is mounted under the rear portion of the trailer and the wheels of each pair are mounted on a common axle and located at opposite sides of the trailer frame. Rocker arms attached to the axles through suitable universal connections hold the pairs of wheels in fixed, spaced relation, but permit independent, vertical movement of each wheel. The truck is attached to the trailer through walking beams and connecting linkage, and is held in proper alignment by suitable radius rod mechanisms in a manner hereinafter more fully described. Additional ground-engaging wheels are rotatably mounted on stub shafts carried by the walking beams. The latter wheels trail the pairs of wheels above referred to and are held in alignment therewith by the beams.

This wheel assembly thus provides a plurality of ground-engaging wheels arranged to distribute the weight of the vehicle and its load and to afford relatively great road-contacting surface. All of the wheels have independent movement in a vertical plane to accommodate unevenness in the roadway and each wheel is readily accessible for tire replacement or repair.

Figure 7:
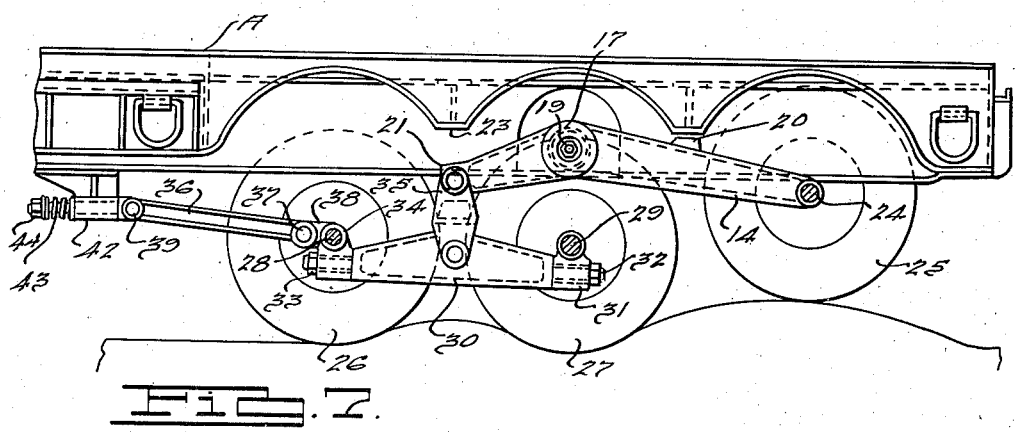

In the drawings forming a part of this specification and wherein like numerals are employed to designate like parts throughout the same:

Fig. 1 is a side elevation of a trailer embodying the invention, showing one set of wheels removed to more clearly illustrate the assembly, Fig. 2 is a top plan view of the trailer, Fig. 3 is a vertical, sectional view taken on the line 3—3 of Fig. 1, Fig. 4 is a vertical, sectional view taken on the line 4—4 of Fig. 1, Fig. 5 is a fragmentary, vertical, sectional view taken on the line 5—5 of Fig. 1, Fig. 6 is an enlarged, fragmentary side elevation of the trailer and rear wheel assembly showing the wheels disposed to accommodate unevenness in the road surface, and Fig. 7 is a view similar to Fig. 6, but showing another position of the road-engaging wheels.

In the drawings, wherein, for the purpose of illustration, is shown a preferred embodiment of the invention, the letter A designates a heavy-duty trailer which is attached in the conventional manner to a tractor vehicle B. The trailer frame includes a plurality of spaced, parallel, longitudinally extending struts 10, 11, and 12, which extend below the main frame, as best shown in Fig. 3, and carry the novel rear wheel assembly.

The rear wheel assembly is mounted on a horizontal shaft 13, which is positioned transversely of the trailer frame and carried by the struts 10, 11, and 12. Walking beams 14 journaled on the ends of shaft 13 are provided with bushings 15 and are confined between wear plates 16 welded or otherwise secured on the struts 10 and 12 and end plates 17 which are held in place by rod 18 and nuts 19. The walking beams 14 have independent rocking movement about the shaft 13 and, since they carry the full weight imposed upon the rear wheels of the trailer, bushings 15 are removable for replacement whenever excessive wear occurs. Movement of the beams 14 about their pivots is limited by engagement of bumpers 20 and 21 with the surfaces 22 and 23 on the trailer frame.

The forward ends of the walking beams 14 are supported by a four-wheel truck, hereinafter described in detail, and the rearward ends thereof carry outwardly extending stub axle 24 upon which ground-engaging wheels 25 are rotatably mounted in the conventional manner.

The four-wheel truck, above referred to, comprises front and rear pairs of wheels 26 and 27. The wheels of each pair are mounted for rotation in the conventional manner upon axles 28 and 29, respectively, and are arranged at opposite sides of the trailer in front of the wheels 25. The pairs of wheels are held in fixed, spaced relation by rocker arms 30 and trunnion blocks 31, as best shown in Figs. 1 and 3. The rocker arms extend between axles 28 and 29 and a rocker arm is provided at each side of the trailer below walking beams 14. The trunnion blocks 31 are held on trunnions 32 at the ends of the rocker arms 30 by nuts 33 and are formed with bearings 34 which receive the axles 28 and 29. The trunnion blocks 31 are free to oscillate on the supporting trunnions 32, but axles 28 and 29 are held stationary in the bearings 34. Links 35 are pivotally attached to the rocker arms 30 substantially centrally thereof and to the forward ends of the rocking beams 14. The mounting of the rocker arms 30 and trunnion blocks 31 permits each wheel of the truck to move vertically independently of the others.

The truck is held in alignment by radius rods 36 at each side of the trailer frame. The rearward ends of the radius rods 36 are pivotally connected at 37 to lugs 38 on the forward trunnion blocks 31 and the forward ends thereof are pivotally connected at 39 to clevis members 40. The clevis members 40 are provided with threaded shanks 41 which pass through horizontal bearings 42 mounted on the trailer frame, and springs 43 on the projecting ends of the shanks are confined by nuts 44.

It may thus be seen that all of the wheels of the assembly are removable from the outside so that changes or repair of tires can be made when the trailer is loaded. Each of the wheels is movable vertically independently of the others, as shown in Figs. 6 and 7, to accommodate unevenness in the road surface. Walking beams 14 rock on shaft 13 to accommodate vertical movement of rear wheels 25 and simultaneous movement of the front and center pairs of wheels 26 and 27. Independent vertical movement of the front and center pairs of wheels is provided by rocking arms 30 and links 35, and independent movement of the wheels in each pair is permitted by trunnion blocks 31. Springs 43 relieve torque produced when one wheel of the front or center pair moves up and the other down.

It is to be understood that the form of the invention herewith shown and described is to be taken as a preferred example of the same, and that various changes in the size, shape, and arrangement of parts may be resorted to without departing from the spirit of the invention or the scope of the appended claims.

What is claimed is:

1. In a heavy duty vehicle, a frame; a pair of walking beams mounted on the frame at opposite sides thereof for independent movement about transverse axes; stub axles on the rearward ends of the walking beams; wheels mounted for rotation on said stub axles; a four-wheel truck supporting the forward ends of the walking beams, said truck including forward and rearward pairs of wheels, the wheels of each pair mounted on a common axle and arranged at opposite sides of the frame, rocker arms bridging the axles adjacent their ends, trunnion blocks connected to the axles and journaled on said rocker arms for movement about axes extending transversely to said axles; vertical links pivotally connecting the forward ends of the walking beams to said rocker arms intermediate the ends of the latter; and means for maintaining the wheels of the truck in alignment with the wheels on said stub axles.

2. In a heavy duty vehicle, a frame; a pair of walking beams mounted on the frame at opposite sides thereof for independent movement about transverse axes; stub axles on the rearward ends of the walking beams; wheels mounted for rotation on said stub axles; a four-wheel truck supporting the forward ends of the walking beams, said truck including forward and rearward pairs of wheels, the wheels of each pair mounted on a common axle and arranged at opposite sides of the frame, and rocker arms holding said pairs of wheels in fixed spaced relation; vertical links pivotally connecting the forward ends of the walking beams to said rocker arms intermediate the ends of the latter; and means for maintaining the wheels of the truck in alignment with the wheels on said stub axles.

3. In a heavy duty vehicle, a frame; a pair of walking beams mounted on the frame at opposite sides thereof for independent movement about transverse axes; stub axles on the rearward ends of the walking beams; wheels mounted for rotation on said stub axles; longitudinally spaced pairs of wheels disposed adjacent the forward ends of the walking beams, the wheels of each pair mounted on a common axle and arranged at opposite sides of the frame; rocker arms connected to the axles adjacent the ends of the latter and holding said pairs of wheels in fixed spaced relation; vertical links pivotally connecting the forward ends of the walking beams to said rocker arms intermediate the ends of the latter; and radius rods connecting the rocker arms to the frame and maintaining the wheels of the truck in alignment with the wheels on said stub axles.

4. In a heavy duty vehicle, a frame; a pair of walking beams mounted on the frame at opposite sides thereof for independent movement about transverse axes; stub axles on the rearward ends of the walking beams; wheels mounted for rotation on said stub axles; longitudinally spaced pairs of wheels disposed adjacent the forward ends of the walking beams, the wheels of each pair mounted on a common axle and arranged at opposite sides of the frame; rocker arms connected to the axles adjacent the ends of the latter and holding said pairs of wheels in fixed spaced relation; vertical links pivotally connecting the forward ends of the walking beams to said rocker arms intermediate the ends of the latter; bearings carried by said frame; radius rods connected to the rocker arms extending longitudinally of the frame and through said bearings; and resilient means co-acting with the radius rods to yieldingly resist longitudinal movement thereof in said bearings.

5. A wheel assembly for heavy duty vehicles comprising a pair of spaced axles adapted to extend transversely of the vehicle; ground engaging wheels mounted for rotation on the ends of the axles; rocker arms connected to the axles and holding them in fixed spaced relation; link members carried by the rocker arms intermediate their ends; walking beams each connected at one end to respective link members and adapted intermediate their ends for pivotal connection to said vehicle; stub axles on the opposite ends of said walking beams; ground engaging wheels carried by said stub axles; and means for maintaining said wheels in alignment.

6. A wheel assembly for heavy duty vehicles comprising spaced pairs of wheels arranged in tandem and the wheels of each pair mounted on a common axle; rocker arms holding said pairs of wheels in fixed spaced relation; link members carried by the rocker arms intermediate their ends; walking beams each connected at one end to respective link members and adapted intermediate their ends for pivotal connection to said vehicle; stub axles on the opposite ends of said walking beams; ground engaging wheels carried by said stub axles; and means for maintaining said wheels in alignment.

7. A wheel assembly for heavy duty vehicles comprising spaced pairs of wheels arranged in tandem and the wheels of each pair mounted on a common axle; rocker arms connected to said axles and holding said pairs of wheels in fixed spaced relation; link members carried by the rocker arms intermediate their ends; walking beams each connected at one end to respective link members and adapted intermediate their ends for pivotal connection to said vehicle; stub axles on the opposite ends of said walking beams; ground engaging wheels mounted for rotation on the stub axles; and means connected to said rocker arms and adapted to be connected to the vehicle for holding the wheels in alignment.

FREDERICK M. REID.